United States Patent [19]
Pittinger, Sr.

[11] 4,047,455
[45] Sept. 13, 1977

[54] METHOD AND APPARATUS FOR SHARPENING END OF FILAMENT IN VEGETATION FILAMENT-TRIMMER

[76] Inventor: Charles B. Pittinger, Sr., Rte. 1, Box 68, Weatherford, Tex. 76086

[21] Appl. No.: 676,971

[22] Filed: Apr. 14, 1976

[51] Int. Cl.² .............................................. B21K 19/00
[52] U.S. Cl. ...................... 76/82.1; 30/138; 51/250; 56/295; 76/101 A
[58] Field of Search .............. 30/138, 264, 276, 347; 56/12.7, 250, 295; 76/82.1, 101 A; 51/250, 161

[56] References Cited
U.S. PATENT DOCUMENTS

| | | | |
|---|---|---|---|
| 973,667 | 10/1910 | Kelling | 56/250 X |
| 1,850,624 | 3/1932 | Haines | 51/250 |
| 2,045,187 | 6/1936 | Hurd | 36/250 X |
| 2,447,617 | 8/1948 | Nelson | 51/250 X |
| 3,831,278 | 8/1974 | Voglesonger | 30/276 |

*Primary Examiner*—Harold D. Whitehead
*Attorney, Agent, or Firm*—John F. McClellan, Sr.

[57] ABSTRACT

An abrasive or other filament-working member is mounted at the sweep circle of a vegetation trimmer filament for progressively sharpening the end of the filament and removing excess filament during operation of the vegetation filament-trimmer; the filament working member may include means causing the filament to heat.

10 Claims, 9 Drawing Figures

OLD ART

METHOD AND APPARATUS FOR SHARPENING END OF FILAMENT IN VEGETATION FILAMENT-TRIMMER

This invention relates generally to filament-type vegetation trimmers and specfically to sharpening filaments employed, during operation.

Principal general objects of this invention are to provide improved performance, convenience and safety in filament trimmers of every type, including both hand-held and ground-supported.

A specific object is to provide for automatic sharpening of the end of a vegetation trimmer filament to a predeterminable shape, without shredding or cracking the filament, without straining it or the associated apparatus, and without hazard of hurling pieces of the filament as projectiles.

A vegetation filament-trimmer consists essentially of a length of filament with a drive connected at the inner end for sweeping the outer end in a circular orbit. The terminal end of the filament does most of the cutting under normal circumstances. A soft, feathery, frayed end trims vegetation slower than a sharp, square-cut end. Wear and tear of cutting will eventually cause any filament end of commonly used material to fray or lose shape.

In the old art, wear-frayed ends of filaments are the rule. Interposing a knife in the orbital path of filament to shorten the filament does not solve the shaping problem, since the filament impacts on and wraps around the knife edge and snaps-off part of the filament end. Such impact-and-tension parting tends to leave a randomly split end. The high velocity snapped-off end of the filament comprises a dangerous projectile, the knife itself is another hazard, stresses set up on the equipment in the snapping-off process are undesirable and the frayed end is not only less efficient but can present more sail area to the relative wind, causing unnecessary trailing curve at the tip.

The present invention is provided to avoid these problems and to make available at all times optimal shaping of the filament end.

In brief summary given for purposes of cursive description only and not as limitation, the invention includes in means and method, provision of a vegetation filament-trimmer in combination with a surface having a portion producing progressive-working of the end of the filament on operation of the vegetation filament-trimmer.

The above and other objects and advantages of the invention will become more readily apparent on examination of the following description including the drawings, in which like reference numerals refer to like parts:

OLD ART

Figure 1A:
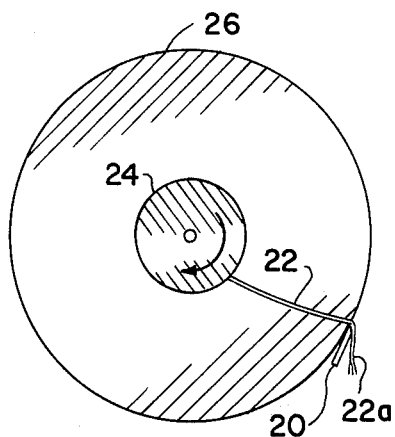
FIGS. 1a, 1b and 1c are successive-position bottom plan diagrams of old art.

FIG. 1a shows a known-art vegetation filament-trimmer arrangement with a knife blade 20 disposed in the orbital path of the filament 22 which sweeps in the direction of the arrow about the hub 24 of the drive shaft. The design sweep-circle 26 of the filament is shown as coincident with a portion of the housing for purposes of exposition only. At the instant shown, the filament has just contacted the knife. Carried by momentum, the end portion 22a of the filament has characteristically wrapped around the cutting edge.

Figure 1B:
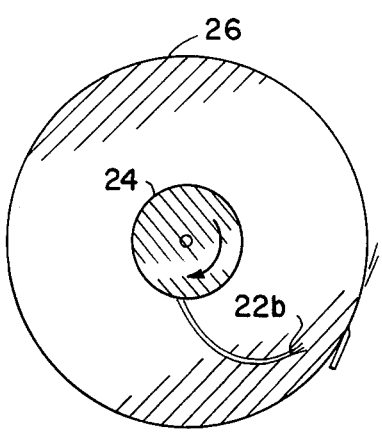

FIG. 1b shows the result. As the main part of the filament drives past the knife the wrapped-around end portion 22a snaps off and tends to fly away at high speed. The new end 22b of the filament formed by the failure at the knife may have almost any shape, depending on material, temperature orbital velocity, knife sharpness, and other variables, but most often is split into slivers.

Figure 1C:
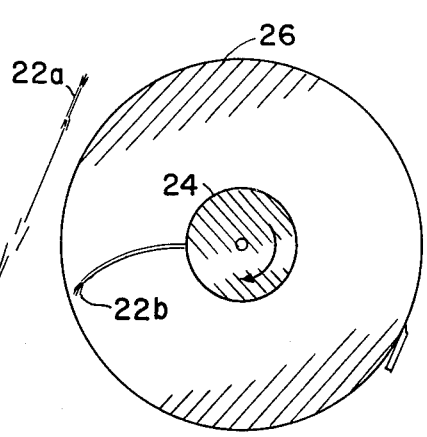

FIG. 1c illustrates a result of such working with a knife when a badly frayed end on the filament causes drag resulting in an increased trailing curve less favorable for cutting.

THE INVENTION

Figure 2A:
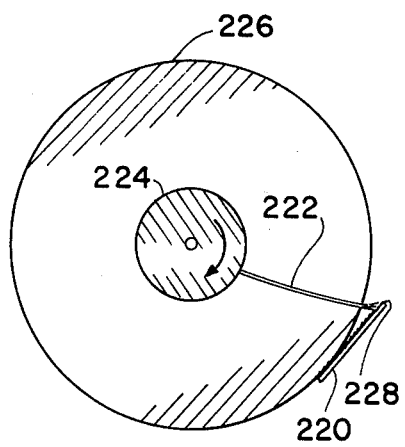
FIGS. 2a, 2b and 2c are successive-position bottom plan diagrams of the present invention.
Figure 2B:
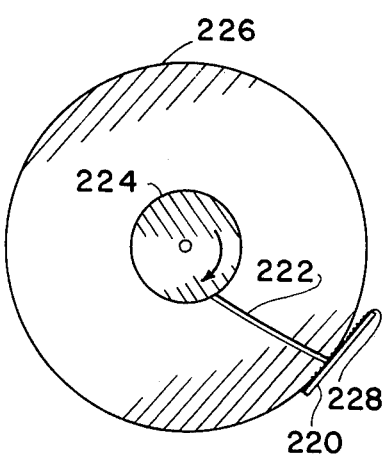

FIG. 2a shows a vegetation filament trimmer with a member according to this invention in combination. An abrasive unit 220 which may be a rasp, or coarse grit-charged paper, plastic or metal; or perforate or otherwise suitable, is placed tangent to the design swing-circle 226 of the end of the filament 222. The end 228 of the abrasive unit preferably extends a distance forward of the point of tangency relative to the direction of filament rotation preventing wraparound by an overlength filament and forming a narrowing approach or guide, inclined with respect to the oncoming swing of the filament so that the terminal end of the filament contacting it progressively abrades in passing, working progressively shortening radius. At the instant shown the filament is just entering this approach and touching at the end. FIG. 2b shows the filament at the tangency point, continuing to abrade smoothly and flinging no lengths of filament.

Figure 2C:
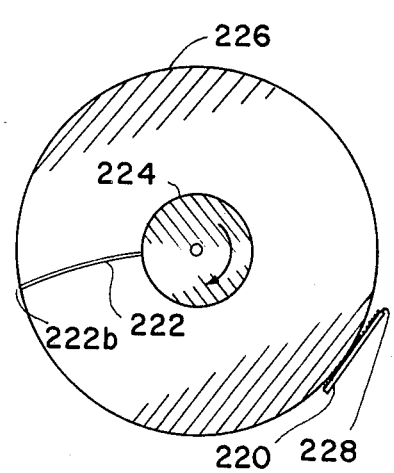

FIG. 2c shows the filament continuing around, at proper length and with the new end 222b precisely shaped. The exact shaping and sharpening action at the end apparently includes from heat as well as abrading. Coarseness or granularity of the abrasive member relative to a filament can be as extreme as desired so long as the end of the filament is progressively worked in passing and does not wrap around the granulations, serrations, perforations or whatever, in passing.

Figure 3:
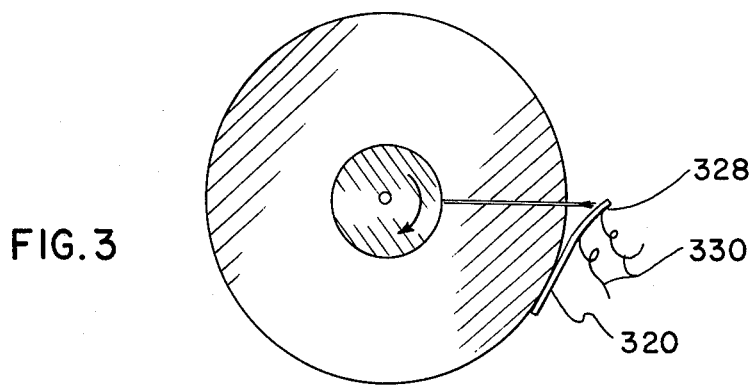
FIG. 3 is a plan detail of the present invention.

FIG. 3 indicates in similar detail that the invention may include a 320 member which may be curved or have a curved portion forwardly 328. This may have a relatively smooth surface with heating means, indicated by leads 330 as being by electrical resistance heating, but which need not be by electrical means, for heating a portion of the passing filament. Any or no part of the surface in this event may be abrasive, depending on the elements employed.

Figure 4:
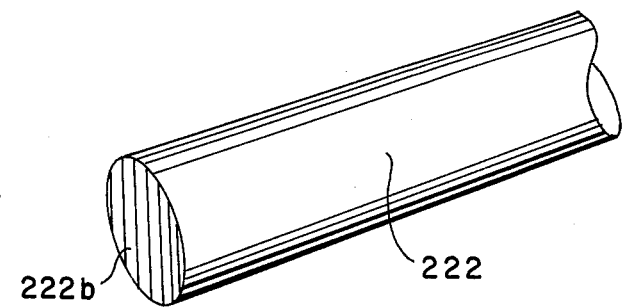
FIG. 4 is an enlarged isometric detail.

FIG. 4 illustrates in enlarged detail a precise sharpening achieved according to this invention. The end is squared-off and full not split, and the plane face 222b at the tip intersects the circumference at a clean sharp perimeter. The face makes an angle with the filament axis of approximately 90°.

Figure 5:
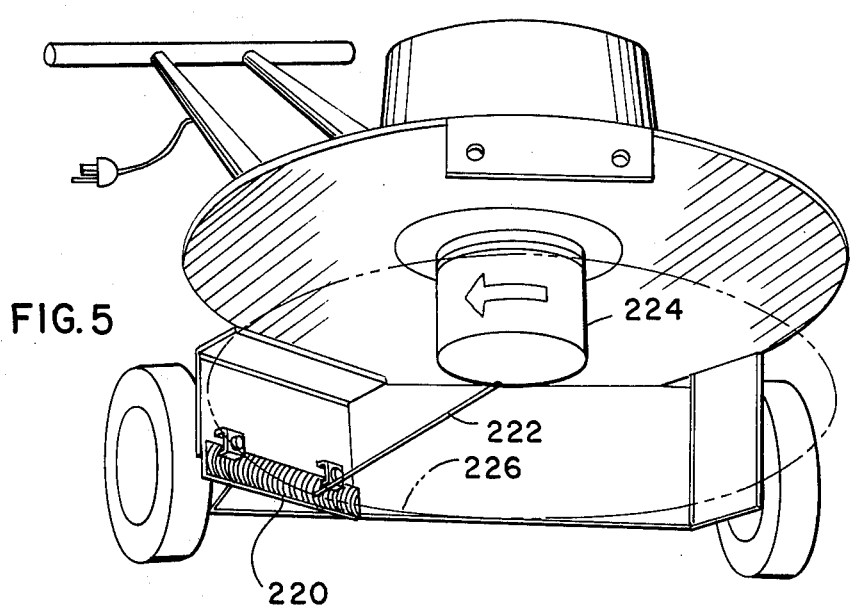
FIG. 5 is an isometric drawing with portions removed of the present invention installed.

FIG. 5 illustrates an installation of the invention. A portion of the housing and the front wheels are shown removed for purposes of exposition. An abrasive unit such as coarse rasp 220 which may have ten transverse serrations to the inch and which is 1¼ inches (3.2cm) wide and 6 inches (15.3cm) long is mounted with a trailing portion tangent to the design swing circle 226 of the filament 222. The abrasive unit may be screwed, clamped, welded, or otherwise suitably held in place. A "Nylon" filament, 1/16 inch (1.5mm) in diameter by 8⅜ inches (21.3cm) swing radius was used in this particular application, rotated within the frequency range normally employed for vegetation filament-trimmers.

In conclusion, it can be seen that this invention rejects the idea of shortening or attempting to shape the end of a filament by means of intercepting an intermediate portion with a knife, but instead progressively works the end of the filament, with the benefits noted regardless of whether manual or mechanical filament feed is employed.

This invention is not to be construed as limited to the particular forms disclosed herein, since these are to be regarded as illustrative rather than restrictive. Additionally, for example, other anti-wraparound structure may be employed. It is, therefore, to be understood that the invention may be practiced within the scope of the claims otherwise than as specifically described.

We claim:

1. In the combination of a vegetation filament-trimmer having a filament with an inner end and an outer end, a drive connection with the inner end for sweeping the outer end in an intended path, and means on the filament trimmer for working the sweep of said outer end to said intended path on operation of the drive, the improvement comprising: the means for working including means for progressively shaping under centrifugal force on sucessively shorter radii the filament outer end to a predeterminable squared-off end shape, and means for holding the means for progressively shaping proximate said intended path.

2. In the combination recited in claim 1, means for preventing the filament from wrapping around the means for progressively shaping including an extension forward of said means for progressively shaping, for receiving the oncoming filament and causing successive removal of a plurality of end portions thereof in passing the means for progressively shaping, the means for holding locating a portion of the means for progressively shaping tangent to the intended circular path.

3. In the combination recited in claim 2, the means for progressively shaping including means for supplying heat to the filament.

4. In the combination recited in claim 2, the means for progressively shaping including a member having a plurality of abrasive elements.

5. In the combination recited in claim 2, the size of the abrasive elements relative to the filament being of proportion precluding abrasive element wrap-around by the filament in passing.

6. In the combination of a powered vegetation trimmer having a filament and a drive for swinging a terminal portion thereof in an intended orbit during operation, and means for working the terminal portion during operation, the improvement comprising: the working means including a member having a forward extension outwardly curved for receiving and directing inwardly said terminal portion, and means for holding said member proximate at least a portion of the intended orbit during operation.

7. In the combination recited in claim 6, means associated with the means for progressively shaping for adding heat to the filament.

8. A process for sharpening the free end of a filament having one end connected to the drive of a vegetation filament-trimmer, comprising the steps:
   a. orbiting the free end of the filament by operating the drive, and
   b. during said operating progressively shortening the free end of the filament, by causing same to contact on progressively shorter radii successive portions of a filament working member, thereby sharpening said free end, during said contact.

9. A process as recited in claim 8, and simultaneously adding heat to a portion of the free end.

10. A process as recited in claim 8, and preventing the filament from wrapping around the filament-working member.

* * * * *

UNITED STATES PATENT OFFICE
CERTIFICATE OF CORRECTION

Patent No. 4047455  Dated September 13, 1977

Inventor(s) CHARLES B. PITTINGER, SR.

It is certified that error appears in the above-identified patent and that said Letters Patent are hereby corrected as shown below:

Claim 1, line 3, after "drive" insert -- having --;

Claim 5, line 1, delete "2" and insert -- 4 --.

*Signed and Sealed this*

*Seventeenth* Day of *January 1978*

[SEAL]

Attest:

RUTH C. MASON  
*Attesting Officer*

LUTRELLE F. PARKER  
*Acting Commissioner of Patents and Trademarks*